(12) United States Patent
Bergman, Jr.

(10) Patent No.: US 7,056,120 B1
(45) Date of Patent: Jun. 6, 2006

(54) METHOD OF COUNTERTOP DISPLAY AND DESIGNATION

(76) Inventor: John W. Bergman, Jr., 4890 Pyramid Mountain Rd., Cascade, CO (US) 80809

(*) Notice: Subject to any disclaimer, the term of this patent is extended or adjusted under 35 U.S.C. 154(b) by 280 days.

(21) Appl. No.: 10/723,884

(22) Filed: Nov. 28, 2003

(51) Int. Cl.
*G09B 25/00* (2006.01)

(52) U.S. Cl. ........................................ 434/72
(58) Field of Classification Search ............... 434/72, 434/73, 74, 78, 79, 80, 98, 367; 446/382, 446/404, 405, 482
See application file for complete search history.

(56) References Cited

U.S. PATENT DOCUMENTS

| | | | | |
|---|---|---|---|---|
| 2,127,047 A | * | 8/1938 | Pinney | 434/80 |
| 2,405,808 A | * | 8/1946 | Armbright | 434/80 |
| 2,984,020 A | * | 5/1961 | Stephen | 434/80 |
| 3,646,690 A | * | 3/1972 | Feagan | 434/73 |
| 4,135,315 A | * | 1/1979 | McKee | 434/79 |
| 4,626,218 A | * | 12/1986 | Wright | 434/73 |
| 4,652,239 A | * | 3/1987 | Brimberg | 434/80 |
| 4,806,102 A | * | 2/1989 | Pedersen et al. | 434/80 |
| 5,910,037 A | * | 6/1999 | Bach et al. | 446/108 |

* cited by examiner

*Primary Examiner*—Kurt Fernstrom
(74) *Attorney, Agent, or Firm*—G. F. Gallinger

(57) ABSTRACT

A method of facilitating visualization and specification of a countertop profile comprises the steps of: i) providing a model of a countertop having a central portion having front and rear edge portions, multiple front portions any one of which may be moved adjacent to a front edge portion of the central portion, and multiple rear portions any one of which may be moved adjacent to the upper rear edge portion of the central portion; ii) selecting a preferred front portion and moving it into alignment with the front edge portion of the central portion; and iii) selecting a preferred rear portion and moving it into alignment with the rear edge portion of the central portion so that a full countertop profile of preferred design is displayed. Most preferably the model comprises a display board having tracks wherein a selected front or rear portion may slide therealong into proper alignment with the central portion. Most preferably the method further comprises the step of designating and identifying the front, central, and rear countertop portions with an alpha numeric character so that a countertop design may be fully specified with an ordered 3 character designation.

11 Claims, 1 Drawing Sheet

METHOD OF COUNTERTOP DISPLAY AND DESIGNATION

FIELD OF THE INVENTION

This invention relates to design selection and specification of countertops. More particularly this invention relates to a method which facilitates the visualization and specification of alternative designs of countertops.

BACKGROUND OF THE INVENTION

Currently countertop companies define a countertop as a "complete" profile. Most countertop companies display only six to twelve profiles. A potential purchaser is required to select from among approximately 100 combinations of countertop styles without the benefit of seeing complete profiles. Most individuals are able to fully consider more than twelve of these "made up" combinations. The human mind is unable to weigh the benefits of 100 alternative designs concurrently. What is needed is an iterative method wherein the individual is confronted with a selection from a manageable number of alternatives. What also is needed is a model which will facilitate visualization of a selected design, as well as alternatives and variations to that selected design.

An iterative method of selection can facilititate now cumbersome systems of specifying the chosen design. Countertop manufacturers currently do not have a simple specification system to define the approximately 100 combinations of countertop profiles. A logical method of specification is disclosed which greatly simplifies the choice, the specification, and the actual construction of a selected style of countertop. The simplicity of the method will not only eliminate errors but result in instantaneous and paperless communication by those familiar with the method.

OBJECTS OF THE INVENTION

It is an object of this invention to disclose an improved and simplified method of selecting, visualizing, and communicating a selected style of countertop. It is an object of this invention to disclose a method which will reduce the need for elaborate specification of varying designs of countertops. It is an object of this invention to disclose a model which will reduce error, and expedite communication among those working with countertop specification. It is an object of this invention to disclose a model which will allow a consumer to actually build alternative countertops so that they are able to better visualize and select between alternative designs. It is yet a further object of this invention to disclose a model which will better enable a consumer to accurately determine and select the best countertop for their needs.

One aspect of this invention provides for a method of facilitating visualization and specification of a countertop profile. The method comprises the steps of: i) providing a model of a countertop having a central portion having front and rear edge portions, multiple front portions any one of which may be moved adjacent to a front edge portion of the central portion, and multiple rear portions any one of which may be moved adjacent to the rear edge portion of the central portion; ii) selecting a preferred front portion and moving it into alignment with the front edge portion of the central portion; and iii) selecting a preferred rear portion and moving it into alignment with the rear edge portion of the central portion so that a full countertop profile of preferred design is displayed.

In a preferred aspect of this method the model comprises a display board having tracks extending between the central portion, and the front and rear portions of the countertop, wherein a selected front or rear portion may slide therealong into proper alignment with the central portion.

In yet another preferred aspect of this invention the method further comprises the step of designating and identifying the front, central, and rear countertop portions with an alpha numeric character so that a countertop design may be fully specified with an ordered 3 character designation.

Various other objects, advantages and features of this invention will become apparent to those skilled in the art from the following description in conjunction with the accompanying drawings.

FIGURES OF THE INVENTION

Figure 1:
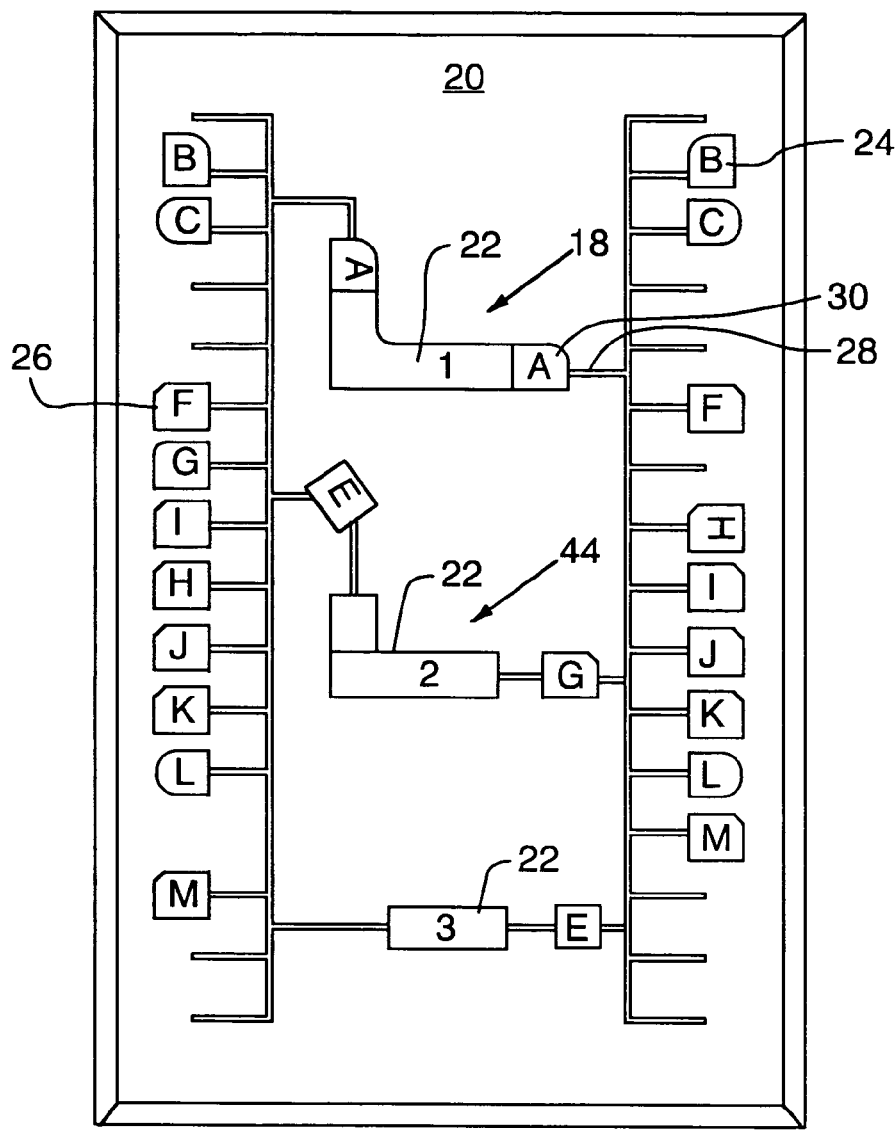
FIG. 1 is a perspective view of a display board having central portions of countertops centrally attached thereto and having multiple front and rear countertop edge portions slidably positioned in tracks which extend to a front or rear edge portion of the central portion of the countertop.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a display board 20 having central portions of countertops 22 centrally attached to the board 20 and having multiple front countertop portions 24 and rear countertop portions 26 slidably positioned in tracks 28 which extend to a front or rear edge portion of the central portion of the countertop 22. Most generally a method of facilitating visualization and specification of a countertop profile 18 comprising the steps of: i) providing a model of a countertop 18 having a central portion 22 (which most preferably is generally L shaped and truncated in length) having front and upper rear edge portions, multiple front portions 24 any one of which may be moved adjacent to a front edge portion of the central portion 22, and multiple rear portions 26 any one of which may be moved adjacent to the upper rear edge portion of the central portion 22; ii) selecting a preferred front portion 24 and moving it into alignment with the front edge portion of the central portion 22; and iii) selecting a preferred rear portion 26 and moving it into alignment with the upper rear edge portion of the central portion 22 so that a full countertop profile 18 of preferred design is displayed. Within this specification "model" is defined and intended to include a graphical representation of a countertop 18 on a computer monitor (not shown) or any physical representation of a countertop 18 whether or not of actual size. It is also intended that the model herein include any plastic laminate or solid surface material such as granite, marble or a man made composite.

In the most preferred embodiment of the invention the method further comprises the step of designating and identifying the front 24, central 22, and rear 26 countertop portions with an alpha numeric character 30 so that a countertop profile may be fully specified with an ordered 3 character designation. Most preferably the front and rear countertop portions 24,26 are identified with one of a letter and a numeric digit 30, and wherein the other of the letter and numeric digit 30 specify the central portion 22 of the countertop. For example a complete countertop profile might be fully specified by the designation "A2A".

In a preferred aspect of this invention the model comprises a board 20 displaying cross sectional strips cut from across countertops 18, one strip of a central countertop portion 22 is centrally affixed to the display board 18, and wherein cross sectional pieces of different designs of front countertop portions 24 are arranged along a front edge of the central portion 22, and wherein cross sectional pieces of different rear countertop portions 26 are arranged along a rear edge of the central portion 22 so that a complete countertop profile 18 cross section is shown when a selected front countertop portion 24, and selected rear countertop portion 26, are juxtaposed with the front and upper rear edge portions of the central countertop portion 22.

In a preferred aspect of this invention the board 18 further comprises tracks 28 extending from the front and rear counter top portions 24,26 respectively to the front and rear edge portions of the central countertop portion 22, so that a user may slide a selected front and rear countertop portion 24,26 into a properly aligned position with the central countertop portion 22, thereby displaying a complete countertop profile 18. Most preferably the track 28 extends through a thickness of the display board 20. The front and rear countertop portions 24,26 are slidably attached to the board 20 by a member 32 extending through and behind the board 20.

Figure 2:
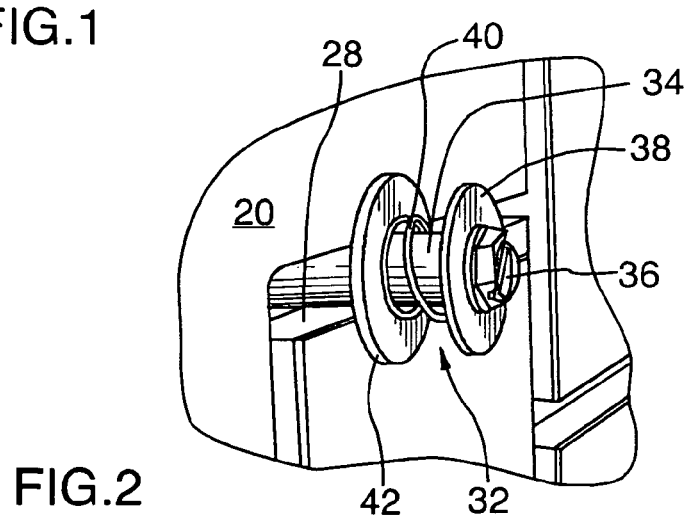
FIG. 2 is a partial perspective view of a rear side of the display board showing the attachment of a front or rear portion of the countertop profile within the track.

FIG. 2 is a partial perspective view of a rear side of the display board 20 showing the attachment of a front 24 or rear 26 portion of the countertop profile 18 within the track 28. Most preferably the member 32 extending through and behind the board 20 comprises a cylindrical sleeve 34 having an outside diameter nominally less than the width of the track 28 which is cut through the thickness of the display board, and wherein a screw 36 extends first through a flat washer 38, the sleeve 34 in the track 28, and then into one of the countertop portions 24,26 thereby slidably attaching the countertop portion 24,26 to a front side of the board 20 over the track 28 therein. In the most preferred aspect of this invention the attachment member 32 further comprises a spring 40 and a friction flat washer 42, said spring 40 and friction washer 42 having an inside opening which closely and slidably exceeds the outside diameter of the sleeve 34, so that when the friction washer 42 and then the spring 40 are positioned over the sleeve 34 before the screw 36 and flat washer 38 attach the sleeve 34 to the end portion of the countertop 24,26, the end portion of the countertop 24,26 is thereby pulled against a front side portion of the board 20 over the track 28.

In the most preferred aspect of this invention the board 20 further comprises a second countertop profile 44 having a second central countertop portion 22 centrally positioned on the display board 20, said second central countertop portion 22 similarly having cross sectional pieces of different designs of front countertop portions 24 arranged along a front edge of the central portion 22, and cross sectional pieces of rear countertop portions 26 arranged along an upper rear edge of the central portion 22 so that a second complete countertop profile 18 is shown when selected countertop portions 24,26 are juxtaposed adjacent to the front and upper rear edge portions of the second central contertop portion 22 thereby facilitating comparison between two complete countertop profiles 18,44 of interest.

In the most preferred aspect of this invention the display board 20 further comprises a third central countertop portion 22 centrally positioned on the display board 20, said third central countertop portion 22 having a generally planar profile, and similarly having cross sectional pieces of different designs of front countertop portions 24 arranged along a front edge of the central portion 22, and cross sectional pieces of rear countertop portions 26 arranged along a rear edge of the central portion 22 so that a generally planar complete countertop profile 18 is shown when selected countertop portions 24,26 are juxtaposed adjacent to the front and rear edge portions of the generally planar central contertop portion 22. The inventor has found that overall dimensions of 23" by 38" are ideal for the display board 18.

While the invention has been described with preferred specific embodiments thereof, it will be understood that this description is intended to illustrate and not to limit the scope of the invention, which is defined by the following claims.

I claim:

1. A method of facilitating a tactile impression, visualization, and specification of a countertop profile comprises the steps of:
   i) providing a model of countertops having a central portion having front and rear edge portions, multiple front portions any one of adapted to be moved adjacent to a front edge portion of the central portion, and multiple rear portions any one of which may be moved adjacent to the rear edge portion of the central portion;
   ii) selecting a preferred front portion and moving it into alignment with the front edge portion of the central portion; and,
   iii) selecting a preferred rear portion and moving it into alignment with the rear edge portion of the central portion so that a full countertop profile of preferred design is displayed.

2. A method as in claim 1 wherein the countertop profile is generally L shaped, the central portion of the countertop profile is truncated in length, and has a full scale front edge portion and a full scale rear upper edge portion.

3. A method as in claim 2 further comprising the step of designating and identifying each of the front, central, and rear countertop portions with an alpha numeric character so that a countertop profile may be fully specified with an ordered 3 character designation.

4. A method as in claim 3 wherein each of the front and rear countertop portions are identified with one of a letter and a numeric digit, and wherein the other of the letter and numeric digit specify the central portion of the countertop.

5. A method as in claim 2 wherein the model comprises a board displaying cross sectional strips cut from across countertops, one strip of a central countertop portion is centrally affixed to the display board, and wherein cross sectional pieces of different designs of front countertop portions are arranged along a front edge of the central portion, and wherein cross sectional pieces of different rear countertop portions are arranged along a rear edge of the central portion so that a complete countertop cross section is shown when a selected front countertop portion, and selected rear countertop portion, are juxtaposed with the front and upper rear edge portions of the central countertop portion.

6. A method as in claim 5 wherein the board further comprises tracks extending from the front and rear counter top portions respectively to the front and rear edge portions, so that a user may slide a selected front and rear countertop portion into a properly aligned position with the central countertop portion, thereby displaying a complete countertop profile.

7. A method as in 6 wherein the track extends through a thickness of the display board and wherein the front and rear countertop portions are slidably attached to the board by a member extending through and behind the board.

8. A method as in claim 7 wherein the member attaching the front and rear countertop portions to the board comprises a cylindrical sleeve having an outside diameter nominally less than the width of the track which is cut through the thickness of the display board, and wherein a screw extends first through a flat washer, the sleeve in the track, and then into one of the countertop portions thereby slidably attaching the countertop portion to a front side of the board over the track therein.

9. A method as in claim 8 further comprising a spring and a friction flat washer, said spring and friction washer having an inside opening which closely and slidably exceeds the outside diameter of the sleeve, so that when the friction washer and then the spring are positioned over the sleeve before the screw and flat washer attach the sleeve to the end portion of the countertop, the end portion of the countertop is thereby pulled against a front side portion of the board over the track.

10. A method as in claim 9 further comprising a second central countertop portion centrally positioned on the display board, said second central countertop portion similarly having cross sectional pieces of different designs of front countertop portions arranged along a front edge of the central portion, and cross sectional pieces of rear countertop portions arranged along an upper rear edge of the central portion so that a second complete countertop profile is shown when selected countertop portions are juxtaposed adjacent to the front and upper rear edge portions of the second central countertop portion thereby facilitating comparison between two complete countertop profiles of interest.

11. A method as in claim 10 further comprising a third central countertop portion centrally positioned on the display board, said third central countertop portion having a generally planar profile, and similarly having cross sectional pieces of different designs of front countertop portions arranged along a front edge of the central portion, and cross sectional pieces of rear countertop portions arranged along a rear edge of the central portion so that a generally planar complete countertop profile is shown when selected countertop portions are juxtaposed adjacent to the front and rear edge portions of the generally planar central countertop portion.

* * * * *